US008002194B2

(12) United States Patent
Geuens et al.

(10) Patent No.: US 8,002,194 B2
(45) Date of Patent: Aug. 23, 2011

(54) SMART INFORMATION CARRIER AND PRODUCTION PROCESS THERFOR

(75) Inventors: Ingrid Geuens, Emblem (BE); Peter Willaert, Destelbergen (BE); Walther Wouters, Heist op den Berg (BE)

(73) Assignee: Agfa HealthCare, N.V., Mortsel (BE)

( * ) Notice: Subject to any disclaimer, the term of this patent is extended or adjusted under 35 U.S.C. 154(b) by 498 days.

(21) Appl. No.: 12/142,618

(22) Filed: Jun. 19, 2008

(65) Prior Publication Data

US 2008/0314988 A1    Dec. 25, 2008

Related U.S. Application Data

(60) Provisional application No. 60/950,665, filed on Jul. 19, 2007.

(30) Foreign Application Priority Data

Jun. 22, 2007    (EP) ..................................... 07110832

(51) Int. Cl.
G06K 19/06    (2006.01)
(52) U.S. Cl. ........................................ 235/492; 235/488
(58) Field of Classification Search ................... 235/492
See application file for complete search history.

(56) References Cited

U.S. PATENT DOCUMENTS

| 2,352,014 | A |   | 6/1944 | Rott |
|---|---|---|---|---|
| 4,754,319 | A | * | 6/1988 | Saito et al. ................... 257/679 |
| 5,888,624 | A |   | 3/1999 | Haghiri et al. |
| 6,248,199 | B1 |   | 6/2001 | Smulson |
| 6,248,643 | B1 |   | 6/2001 | Hsieh et al. |
| 6,404,643 | B1 |   | 6/2002 | Chung |
| 6,406,935 | B2 |   | 6/2002 | Kayanakis et al. |
| 6,424,029 | B1 |   | 7/2002 | Giesler |
| 6,536,664 | B2 |   | 3/2003 | Nordqvist et al. |
| 6,786,419 | B2 |   | 9/2004 | Kayanakis |
| 7,287,704 | B2 | * | 10/2007 | Herslow ........................ 235/488 |
| 2005/0084693 | A1 |   | 4/2005 | LaBrec |

FOREIGN PATENT DOCUMENTS

| EP | 0 742 926 A1 | 8/1995 |
|---|---|---|
| EP | 1 054 414 A1 | 11/2000 |
| GB | 2 105 952 A | 3/1983 |
| GB | 2 129 371 A | 5/1984 |
| WO | WO 99/24934 A1 | 5/1999 |
| WO | WO 00/26856 A2 | 5/2000 |
| WO | WO 01/18748 A1 | 3/2001 |
| WO | WO 01/41060 A1 | 6/2001 |
| WO | WO 01/41062 A1 | 7/2001 |
| WO | WO 03/025953 A1 | 3/2003 |
| WO | WO 03/056499 A2 | 7/2003 |
| WO | WO 2004/039604 A1 | 5/2004 |
| WO | WO 01/41061 A1 | 6/2004 |
| WO | WO 2005/056304 A1 | 6/2005 |

OTHER PUBLICATIONS

European Search Report for EP 2 014 463 A1 (Dec. 5, 2007).

* cited by examiner

*Primary Examiner* — Jamara A Franklin
(74) *Attorney, Agent, or Firm* — Leydig, Voit & Mayer, Ltd.

(57) ABSTRACT

Disclosed is a smart information carrier containing a security element laminated with a transparent polymer foil having a melting point higher than 150° C. and the security element is surrounded by an edge at least 1 mm wide in which the transparent polymer foil on each side of the security element are laminated to one another, the security element including an IC-module and a fibre-containing continuous support, wherein the support is security printed on at least the side of the support nearer to the IC-module and the IC-module is encapsulated with a transparent polymer or polymer mixture with a melting point up to 150° C. wherein the transparent polymer or polymer mixtures also coats the side of the support nearer to the IC-module. Also disclosed is a method of preparing the smart information carrier.

7 Claims, No Drawings

SMART INFORMATION CARRIER AND PRODUCTION PROCESS THERFOR

CROSS-REFERENCE TO RELATED PATENT APPLICATIONS

This application claims the benefit of U.S. Provisional Application No. 60/950,665 filed Jul. 19, 2007, which is herein incorporated by reference. In addition, this application claims the benefit of European Application No. 07110832.8 filed Jun. 22, 2007, which is also herein incorporated by reference.

FIELD OF THE INVENTION

The present invention relates to improved smart information carriers and a production process therefor.

BACKGROUND OF THE INVENTION

The security field encompasses not only personalized documents such as passports, driving licenses, identity cards (ID cards) and admission documents such as visa's and entry tickets, but also the authentification and identification of goods to avoid counterfeiting, tampering and fraud such as lottery tickets, share certificates, transaction documents, labels on luggage and the packaging of pharmaceuticals and high value products in general.

The term "identity card" encompasses cards requiring bearer identification and range from passports to national identity cards to establish the national identity of their civilians to cards involved in the electronic transfer of money such as bank cards, pay cards, credit cards and shopping cards to security cards authorizing access to the bearer of the card to particular areas such as a company (employee ID card), the military, a public service, the safe deposit departments of banks, etc. to social security cards to membership cards of clubs and societies.

The first type of information may be general information such as a name and/or logo of the issuing authority, or security marks, such as a watermark and security print, e.g. a repeating monochrome pattern or a gradually changing colour pattern which are difficult to counterfeit. The second type includes e.g. the unique card number, personal data such as a birth day, a photo of the owner, and a signature. The card can further contain hidden information and therefore contain a magnetic strip or an electronic chip ("smart cards").

Typically, a smart card includes a microprocessor (or electronic processing circuitry) and/or memory circuitry embedded therein. The electronic circuitry is often packaged as a module. A memory smart card stores information in electronic memory circuits, while a processor smart card can manipulate information stored in associated memory. Of course a smart card module can include both processing and memory circuitry. A "contact" smart card communicates via a physical contact interface. A contact smart card is typically inserted into a smart card reader, thereby making physical contact between the interface and the reader. A "contactless" smart card may have an antenna through which signals are communicated, as shown in U.S. Pat. No. 6,424,029. Thus, a contactless smart card may not need a physical interface. Of course, a smart card can include both a contact and contactless (e.g. antenna and supporting circuitry) interface. A smart card may be passive in that it lacks an internal power source. Power can be supplied through its interface, which energizes the smart card's internal circuits or via an internal power source.

Smart cards are capable of performing a variety of functions, including carrying data, manipulation or processing information and data, controlling access (e.g., by carrying pass codes, biometric data, passwords, etc.), providing identifying information, holding biometric data, etc. Of course, this is not an exhaustive list of possible smart card functionality.

A large set of ID cards are usually prepared on a large carrier of information such as a web or sheet by a step and repeat process, after which the information carrier is cut into multiple items with the appropriate dimensions each representing a personal ID card. ISO 7810 specifies three formats for identity cards: ID-1 with the dimensions 85.60 mm×53.98 mm, a thickness of 0.76 mm is specified in ISO 7813, as used for bank cards, credit cards, driving licences and smart cards; ID-2 with the dimensions 105 mm×74 mm, as used in German identity cards, with typically a thickness of 0.76 mm; and ID-3 with the dimensions 125 mm×88 mm, as used for passports and visa's.

Normally, the card is protected by a plastic sheet material for example by lamination of the card to a plastic sheet or, as is usually the case, by lamination between two plastic sheets.

In view of their widespread uses, particularly in commercial transactions such as cashing cheques, credit purchases etc., it is important that the person relying on the ID card to identify the bearer have maximum assurance that the ID card has not been altered and/or that the ID card is not a counterfeit.

GB 2129371A discloses an identity card or the like comprising a security layer wholly encapsulated, by means of adhesives or the like, between a pair of protective sheets, a first sheet if said pair being transparent to reveal said security layer and a second sheet of said pair bearing upon at least a major portion of its external surface area a material which is capable of receiving markings such as are made by writing, stamping or printing in inks or the like.

GB 2105952 discloses a antitheft label including a radio frequency responder circuit which comprises a tuned circuit incorporating a circuit element the characteristics of which are such that when the circuit is placed in a radio frequency field exceeding a predetermined strength of the frequency to which the circuit is tuned the circuit element is destroyed and the responder is thereby rendered ineffective. FIG. 1 of GB 2105952 shows a label fabricated with a circuit which is printed in conductive ink, stamped out of foil, etched or otherwise deposited on a flexible or rigid plastic, cloth or paper substrate, the tuned circuit consisting of one or more antenna patterns with a loop, the loop incorporating a gap which is bridged by a diode in an integrated circuit.

U.S. Pat. No. 5,588,624 discloses a data carrier formed as an IC card consisting of at least one of paper and cardboard, said data carrier comprising a card body made of at least one of paper and cardboard, and an electronic module for exchanging data with an external device, dimensions of said card body fulfilling ISO standard ISO 7810, said electronic module having contact surfaces for touch contact, and said electronic module being embedded in said card body at such a position that said contact surfaces are located in an area of said data carrier fixed by ISO standard ISO 7816/2.

U.S. Pat. No. 6,406,935 discloses a manufacturing process of a hybrid contact-contactless smart card with an antenna support made of fibrous material such as the paper, including the following steps: a manufacturing process of the antenna consisting in screen printing turns of electrically conductive polymer ink on a support made of fibrous materials and to subject said support to a heat treatment in order to bake said ink, a step for laminating the card body onto the antenna support consisting in welding on each side of said support at least two sheets of plastic material, forming the card bodies, by hot press molding, a cavity milling step consisting in piercing, in one of the card bodies, a cavity for housing the module comprised of the chip and the double-sided circuit, said cavity including a smaller internal portion which receives the chip and a larger external portion for receiving the double-sided circuit, said cavity including a smaller internal portion which receives the chip and a larger external portion for receiving the double-sided circuit, said cavity being dug into the card body which is opposite the side of the support featuring the electrically conductive screen printed ink which forms the antenna, and the milling operation enabling the connection pads to be removed from the chip, and a module insertion step consisting in using a glue enabling said module to be secured and a glue containing silver for connecting said module to said connectors, and to position said module in the cavity provided to this end.

U.S. Pat. No. 6,248,643 discloses a method for the continuous fabrication of electronic access control cards, comprising the steps of: extruding continuous upper and lower layers of hot extrudate material; introducing a continuous carrier sheet between said upper and lower layers, said carrier sheet bearing microcircuits at spaced locations there along; pressing said upper and lower layers into adhesion with each other while in a plastic state thereby to make a composite sheet of substantially constant thickness having an upper and a lower surface and containing said microcircuits suspended in said extrudate material in spaced relationship to both said upper and said lower surface; cooling said composite sheet to solidify said hot extrudate material; and cutting said composite sheet thereby to cut out access control card blanks containing a microcircuit in substantially consistent relative position in each card blank; characterized in that said carrier sheet is narrower than said composite sheet and has openings between consecutive ones of said microcircuits in said continuous carrier sheet, said openings having a length somewhat shorter than the width of said carrier sheet and a width measured along the length of said web sheet somewhat greater than the spacing between consecutive ones of said card blanks thereby to allow contact between said upper and lower layers for bonding along all edges of said card and to limit the web edge to show only along small portions of card edges for improved esthetic appearance and prevent delamination of the card in use, and additional openings in said carrier sheet to permit bonding of said upper and lower layers to each other at additional locations between said edges of said card.

U.S. Pat. No. 6,404,643 discloses an article having an electronic device embedded therein comprising: a substrate having first and second opposing substantially parallel broad planar surfaces and having at least two electrical contacts on the first broad planar surface thereof; an electronic device mounted on the first broad planar surface of said substrate and having at least first and second electrical contacts connected respectively to the at least two electrical contacts of said substrate; a layer of melt-flowable adhesive on the first broad planar surface of said substrate covering said electronic device, wherein said layer of melt-flowable adhesive is of substantially uniform thickness; and a card blank having first and second opposing substantially parallel broad planar surfaces, wherein the first broad planar surface thereof is bonded to the first broad planar surface of said substrate by said layer of melt-flowable adhesive, wherein said electronic device is disposed between said substrate and said card blank and is encapsulated by said layer of melt-flowable adhesive.

U.S. Pat. No. 6,536,664 discloses a manufacturing process of a contactless smart card with an antenna support made of fibrous material such as paper, comprised of the following steps: a manufacturing process of the antenna consisting in screen printing turns of electrically conductive polymer ink on a support made of at least one fibrous material and to subject said support to a heat treatment in order to bake said ink, a bonding step using electrically conductive adhesive to bond the chip's bonding pads onto the antennas bonding pads, and a step which laminates the card bodies onto the antenna support consisting in welding each side of said support to at least two sheets made of plastic material having different stiffness, forming the card bodies, by a hot press molding process, and wherein, during the antenna manufacturing process, the corners of the antenna support are notched in order to allow the two card bodies to be welded together; said card obtained thereby offering a preferential delamination zone which will highlight any act of deliberate damage posterior.

US 2005/084693A1 discloses a laminate for a document comprising: a polyester laminate formed from different polyester materials, one of the polyester materials providing a durability property, and another of the polyester materials providing a layer having a surface with bonding property for bonding directly to a core without adhesive.

WO 99/24934A discloses a smart card, which comprises: a core, comprising a base layer including a foundation layer, the electronic components and a filling, and a top and a bottom intermediate layer on the two faces thereof, said intermediate layers being laminated to said base layer; and a top and a bottom cover leaves, the top leaf at least being transparent, said leaves being laminated respectively to said top and a bottom intermediate layer; personalizing matter visible through at least one of said cover leaves, said matter being carried by a surface chosen from among: a) a face of at least one of said intermediate layers, or b) the rear face of at least one of said cover leaves core.

WO 01/18748A discloses a process for incorporating at least one electronic element in the manufacture of a plastic card, comprising the steps of: (a) providing first and second plastic core sheets; (b) positioning said at least one electronic element in the absence of a non-electronic carrier directly between said first and second plastic core sheets to form a core, said plastic core sheets defining a pair of inner and outer surfaces of said core; (c) positioning said core in a laminator apparatus, and subjecting said core to a heat and pressure cycle, said heat and pressure cycle comprising the steps of: (i) heating said core for a first period of time; (ii) applying a first pressure to said core for a second period of time such that said at least one electronic element is encapsulated by said core; (iii) cooling said core while applying a second pressure to said core; (d) milling a region of said core to a controlled depth so as to form a cavity which exposes at least one contact pad of said electronic element.

WO 04/039604A1 discloses a security document with at least one paper sublayer, both sides of which have been covered in each case by a transparent plastic layer, characterized in that the paper sublayer is a security paper with at least one security feature and that the plastic layers are made of a thermoplastic material, which under the application of increased pressure and/or increased temperature fuses to give a transparent sheath, wherein at least section-wise a border area is present in which the plastic layers are directly in contact with one another. WO 04/039604A1 further discloses that the security feature is a watermark in the paper sublayer or a security element embedded at least partially or section-wise, in particular a security strip or variously coloured fibres, or is a magnetic strip, OVD, RFID or chip applied to the paper sublayer, or is a security print applied to the paper sublayer, in particular in the form of a fluorescent print or of an applied intaglio print, or is a combination of these security features. WO 04/039604A1 further discloses a process for production of a security document as claimed characterized in that, after the at least one paper sublayer (4) has been personalized (16), in particular with the aid of an ink-jet printer, it is surrounded on both sides, in each case by at least one, but preferably by a plurality of, plastics foils, preferably composed of polycarbonate, and this layer structure is fused with use of pressure and/or of elevated temperature to give a transparent sheath (13) in essence enclosing the paper sublayer (4) on all sides, without further assistance of adhesion promoters, such as adhesives.

WO 05/056304 discloses a security document with at least a paper sublayer, both sides of which have been covered in each case by a transparent plastic layer, characterized in that the paper sublayer is a security paper with at least one security feature and that the plastic layers are made of a thermoplastic material, which under the application of increased pressure and/or increased temperature fuses to give a transparent sheath, wherein at least section-wise a border area is present in which the plastic layers are directly in contact with one another; and wherein at least one of the plastic layers exhibits at least a second security feature.

WO 00/26856A discloses a thin flexible electronic radio frequency tag circuit comprising: a) an insulating, flexible substrate having an aperture therein; b) an antenna forming an integral part of said substrate; c) a circuit chip having an antenna connector, said circuit chip being substantially and operably located within the aperture of said substrate; d) a connector for electrically connecting said antenna to said chip antenna connector; and e) an encapsulant having a portion substantially parallel with said substrate, said encapsulant operably retaining said circuit chip within said substrate aperture.

U.S. Pat. No. 6,786,419 discloses a contactless smart card comprising an antenna on an antenna support made of fibrous material, said antenna comprising at least one turn of conductive ink and two contacts which are screen printed on said antenna support, each of said card bodies being made up of at least one layer of plastic material, and a chip provided with contacts connected to the antenna, wherein said card also includes a chip support made of fibrous materials including two strips of polymerizable conductive ink screen printed on said chip support, and to which are connected said contacts of the chip, said chip support being positioned on said antenna support so that said strips of polymerizable conductive ink come into contact with said antenna contacts and connect to the latter, such that said chip is positioned in a cavity in said antenna support, so that no rigid element of the chip comes into contact with said antenna contacts or said antenna.

WO 2003/056499A2 discloses a smart identification document comprising: a core layer including a first surface and a second surface; a first layer of a substantially transparent polymer adjacently arranged on the first surface of the core layer; an aperture including: a first section disposed in the first polymer layer, the first section including a ledge in the first polymer layer, and a second section disposed in at least the core layer; and a module including electronic circuitry, wherein at least a first portion of the module is adjacently arranged with the ledge, and at least a section portion of the module extends into at least some of the second section of the aperture. WO 2003/056499A2 further discloses that an aspect of the present invention involves modification of a synthetic paper core-based identification (ID) document to provide a smart card that includes integrated circuitry (e.g., a semiconductor chip and interface), laser, thermal transfer and/or off-set printed images (e.g., including photographic representations) and/or customized (or personalized) text and data.

Most smart cards are multiplex cards built up of thin plastic sheets. This multiplex structure renders the cards vulnerable to delamination either during normal use so-called wallet residence time or as a result of wilful attempts to falsify the cards. Moreover, this delamination often occurs with substantially no degradation of the information content of the card. Furthermore, the security features currently available with such plastic cards are very limited compared with those available with paper-based identity cards. A further problem is the vulnerability of the connections between the electronic chip and the antenna in contactless cards.

ASPECTS OF THE INVENTION

It is an aspect of the present invention to provide a smart information carrier with improved security features.

It is a further aspect of the present invention to provide a smart information carrier with more secure security features.

It is also an aspect of the present invention to provide smart information carriers with improved reliability.

Further aspects and advantages of the present invention will become apparent from the description hereinafter.

SUMMARY OF THE INVENTION

The incorporation of RF-ID modules into paper-based cards was first disclosed in 1983 in GB 2105952 and in a more refined form in 1995 in EP 0742926A. WO 00/26856A discloses a radiofrequency identification system employing a thin, flexible electronic RFID-tag in which the RFID-tag is placed in a cavity and the RFID-tag is not integrated in an IC-module with an antenna. Kayanakis in WO 01/41060, WO 01/41061 and WO 01/41062 disclosed the printing of antennae on a paper support, but this technology cannot compete in reliability with plastic-based smart cards. Surprisingly it has been found that smart information carriers comprising an interlaminated security-printed natural fibre-containing continuous support incorporating a module which incorporates an electronic chip and an antenna integrated therein provides a smart information carrier with improved security features, more secure security features and improved reliability.

Aspects of the present invention are realized by a smart information carrier comprising a security element having two sides each side being laminated with at least one transparent polymer foil having a melting point higher than 150° C. so that the security element is surrounded by an edge at least 1 mm wide in which the at least one transparent polymer foil on each side of the security element are laminated to one another, the security element comprising an IC-module and a natural fibre-containing or synthetic fibre-containing continuous support exclusive of an antenna, the IC-module comprising an electronic chip and an antenna integrated therein, wherein the support is security printed on at least the side of the support nearer to the IC-module and the IC-module is at least substantially encapsulated with a transparent polymer or polymer mixture with a melting point up to 150° C. which also coats at least the part of the side of the support nearer to the IC-module non-adjacent to the IC-module.

Aspects of the present invention are further realized by a method for producing a smart information carrier comprising the steps of: security printing at least one side of a natural fibre-containing or synthetic fibre-containing continuous support; if only one side of the support is security printed the non-security-printed side of the support is placed on the lower melting point side of a two polymer laminate with the high melting point side having a melting point higher than 150° C. and an IC-module comprising an electronic chip and an antenna integrated therein is placed on the other side of the support; placing a further sheet of a two polymer laminate with the high melting point side having a melting point higher than 150° C. on the IC-module with the lower melting point side nearer the IC-module with at least one sheet of a polymer foil with a melting point of up to 150° C. between the IC-module and the lower melting point-side of the further sheet of a two-polymer laminate; laminating the resulting sandwich in a laminator; and punching out a smart information carrier so that the natural fibre-containing or synthetic fibre-containing continuous support is surrounded by an edge at least 1 mm wide in which the transparent polymer foil are directly laminated to one another, wherein said natural fibre-containing or synthetic fibre-containing continuous support is exclusive of an antenna.

Further aspects of the present invention are disclosed in the dependent claims.

DETAILED DESCRIPTION

Definitions

The term "smart card", as used in disclosing the present invention, means identification cards incorporating an integrated circuit as a so-called electronic chip i.e. so-called radio frequency identification cards or RFID-cards.

The term "security element", as used in disclosing the present invention, means an element incorporating an IC-module and a security-printed natural fibre-containing continuous support.

The term "natural fibre", as used in disclosing the present invention, means a textile fibre of plant origin and includes abaca, bagasse, bamboo, cotton, esparto, flax, hemp, jute, kenaf, linen, reed, silk, sisal, straw and wood fibres.

The term "security print", as used in disclosing the present invention, means a printed image or pattern designed to be difficult to counterfeit and hence providing a security feature e.g. a photographic image.

The term "security paper", as used in disclosing the present invention, means a paper used in a security document.

The term "continuous support", as used in disclosing the present invention, means a support without cavities, holes or other interruptions.

The term "lamination process", as used in disclosing the present invention, means the process of bonding different materials together, usually thin plastic sheets, by means of heat and/or pressure e.g. using roll laminators or plate laminators. In the case of the lamination of thin plastic sheets the result is a flat entity in which the sides thereof are substantially parallel to one another e.g. a card in the case of ID-cards. The process can be continuous or non-continuous (sheet-wise). It can also be used to realize special embossing patterns on the edge of objects such as so-called waffling.

The terms "opaque" or "non-transparent" layer, as used in disclosing the present invention, refer to a layer where less than 15% of the incident light is allowed to pass through the layer. In a "substantially transparent" layer at least 50% of the incident visible light, preferably more than 65% and particularly preferably more than 75%, passes through the layer.

The term "conventional printing process", as used in disclosing the present invention refers to impact printing processes as well as to non-impact printing processes. The term includes but is not restricted to ink-jet printing, intaglio printing, screen printing, flexographic printing, driographic printing, electrophotographic printing, electrographic printing, offset printing, stamp printing, gravure printing, thermal and laser-induced processes and also includes a printing process rendering areas of a conductive layer non-conductive in a single pass process, such as disclosed in EP 1 054 414A and WO 03/025953A, but excludes processes such as evaporation, etching, diffusion processes used in the production of conventional electronics e.g. silicon-based electronics.

The term "impact printing process", as used in disclosing the present invention, means a printing process in which contact is made between the medium in which the print is produced and the printing system e.g. printers in which a master is covered with an ink layer on areas corresponding to a desired image or shape, after which the ink is transferred to the medium, such as dye thermal transfer printing, intaglio printing, screen printing, flexographic printing, offset printing, stamp printing and gravure printing.

The term "non-impact printing process", as used in disclosing the present invention, means a printing process in which no contact is made between the medium in which the print is produced and the printing system e.g. electrographic printers, electrophotographic printers, laser printers, ink jet printers in which prints are produced without needing to strike the print medium.

"PE" is an abbreviation for polyethylene.
"PVC" is an abbreviation for polyvinyl chloride.
"PC" is an abbreviation for polycarbonate.
"PET" is an abbreviation for polyethylene terephthalate.
"PETG" is an abbreviation for polyethylene terephthalate glycol, the glycol indicating glycol modifiers which are incorporated to minimize brittleness and premature aging that occur if unmodified amorphous polyethylene terephthalate (APET) is used in the production of cards.

Smart Information Carrier Configuration

Aspects of the present invention are realized by a smart information carrier comprising a security element having two sides each side being laminated with at least one transparent polymer foil having a melting point higher than 150° C. so that the security element is surrounded by an edge at least 1 mm wide in which the at least one transparent polymer foil on each side of the security element are laminated to one another, the security element comprising an IC-module and a natural fibre-containing or synthetic fibre-containing continuous support exclusive of an antenna, the IC-module comprising an electronic chip and an antenna integrated therein, wherein the support is security printed on at least the side of the support nearer to the IC-module and the IC-module is at least substantially encapsulated with a transparent polymer or polymer mixture with a melting point up to 150° C. which also coats at least the part of the side of the support nearer to the IC-module non-adjacent to the IC-module.

According to a first embodiment of the smart information carrier, according to the present invention, the electronic chip and the antenna are on opposite sides of a single support or on separate supports laminated together.

According to a second embodiment of the smart information carrier, according to the present invention, the radio frequency-readability of the IC-module at a frequency of 13.56 MHz is limited to less than 5 cm.

According to a third embodiment of the smart information carrier, according to the present invention, the chip is secured by the flow of molten polymer through holes in the IC-module.

According to a fourth embodiment of the smart information carrier, according to the present invention, the outermost surface of the IC-module is coated with an opaque layer e.g.

a layer of opaque PE, opaque PETG, polyurethane etc. This obscures the visibility of the IC-module in the smart information carrier.

According to a fifth embodiment of the smart information carrier, according to the present invention, the security printing is only on the same side of the natural fibre-containing or security-printed synthetic fibre-containing continuous support as the IC-module.

According to a sixth embodiment of the smart information carrier, according to the present invention, the security printing is on both sides of the natural fibre-containing or security-printed synthetic fibre-containing continuous support as the IC-module.

According to a seventh embodiment of the smart information carrier, according to the present invention, the security printing is carried out by any conventional printing technique selected from the group consisting of non-impact and impact printing techniques.

According to an eighth embodiment of the smart information carrier, according to the present invention, the security printing of at least one side of the natural fibre-containing or security-printed synthetic fibre-containing continuous support is carried out by a non-impact printing technique selected from the group consisting of ink-jet printing, electrophotographic printing and electrographic printing.

According to a ninth embodiment of the smart information carrier, according to the present invention, the security printing of at least one side of the natural fibre-containing or security-printed synthetic fibre-containing continuous support is carried out by an impact printing technique selected from the group consisting of, dye thermal transfer printing, intaglio printing, screen printing, flexographic printing, offset printing, stamp printing and gravure printing.

The choice of natural-fibre-containing or synthetic fibre-containing continuous support is dictated by the security features that required thereon. In general either the natural-fibre-containing or synthetic fibre-containing continuous support has to have the printability required to realize high quality security print or it has to be a suitable receiving layer for ink-jet printing, thermal sublimation printing, dye diffusion thermal transfer printing or for photographic images such as realized by the silver complex diffusion transfer reversal process, hereinafter referred to as the DTR process, or in standard photographic prints.

The principles DTR process, have been described e.g. in U.S. Pat. No. 2,352,014 and in the book "Photographic Silver Halide Diffusion Processes" by André Rott and Edith Weyde, The Focal Press, London and New York, (1972). In the DTR process non developed silver halide of an information wise exposed photographic silver halide emulsion layer material is transformed with a so called silver halide solvent into soluble silver complex compounds which are allowed to diffuse into an image receiving element and are reduced therein with a developing agent, generally in the presence of physical development nuclei, to form a silver image having reversed image density values ("DTR image") with respect to the black silver image obtained in the exposed areas of the photographic material. Coloured images can also be produced using this process.

Natural Fibre-Containing Continuous Support

According to a tenth embodiment of the smart information carrier, according to the present invention, the natural fibre-containing continuous support is a woven or non-woven material.

According to an eleventh embodiment of the smart information carrier, according to the present invention, the natural fibre-containing continuous support is paper or resin-coated paper.

According to a twelfth embodiment of the smart information carrier, according to the present invention, the natural fibre-containing continuous support is a security paper.

According to a thirteenth embodiment of the smart information carrier, according to the present invention, the natural fibre-containing continuous support is provided with a subbing layer.

According to a fourteenth embodiment of the smart information carrier, according to the present invention, the natural fibre-containing continuous support comprises at least 70% by weight of natural fibres, with at least 80% by weight of natural fibres being preferred.

Synthetic Fibre-Containing Continuous Support

According to a fifteenth embodiment of the smart information carrier, according to the present invention, the synthetic fibre-containing continuous support is a woven or non-woven material.

According to a sixteenth embodiment of the smart information carrier, according to the present invention, the natural fibre-containing continuous support is a synthetic paper e.g. TESLIN, a synthetic paper from PPG Industries or polyethylene paper.

According to a seventeenth embodiment of the smart information carrier, according to the present invention, the synthetic fibre-containing continuous support is provided with a subbing layer.

According to an eighteenth embodiment of the smart information carrier, according to the present invention, the natural fibre-containing continuous support comprises at least 70% by weight of synthetic fibres, with at least 80% by weight of synthetic fibres being preferred.

IC-Module

The IC-module used in the smart information carrier, according to the present invention, comprises an electronic chip and an antenna integrated therein i.e. they together form a unit having the profile of the antenna, with the IC-module preferably having the electronic chip and the antenna on opposite sides of a single support or on separate supports laminated together. The IC-module is able to be detected by and communicate with a RFID-transceiver. The size of the IC-module is determined by the size of the antenna, which at a particular radio-frequency determines the furthest distance over which radio-frequency detection can occur. The larger the IC-module, the more the flexibility of the IC-module determines the flexibility of the smart information carrier as a whole. The IC-circuitry and the chip should be as flat as possible and the IC-module should be as thin as possible. Such integrated IC-modules are commercially available with a thicknesses of 300 to 400 μm.

Method for Producing a Smart Information Carrier

Aspects of the present invention are further realized by a method for producing a smart information carrier comprising the steps of: security printing at least one side of a natural fibre-containing or synthetic fibre-containing continuous support; if only one side of said support is security printed the non-security-printed side of said support is placed on the lower melting point side of a two polymer laminate with the high melting point side having a melting point higher than 150° C. and an IC-module comprising an electronic chip and an antenna integrated therein is placed on the other side of said support; placing a further sheet of a two-polymer laminate with the high melting point side having a melting point higher than 150° C. on said IC-module with the lower melting point side nearer the IC-module with at least one sheet of a polymer foil with a melting point of up to 150° C. between said IC-module and the lower melting point-side of said further sheet of a two-polymer laminate; laminating the resulting sandwich in a laminator; and punching out a smart information carrier so that said support is surrounded by an edge at least 1 mm wide in which the transparent polymer foils are directly laminated to one another, wherein said natural fibre-containing or synthetic fibre-containing continuous support is exclusive of an antenna.

According to a first embodiment of the process for producing a smart card information carrier, according to the present invention, the compositions of the two sheets of two-polymer laminate are the same. However, the thicknesses of the two polymers may be different.

According to a second embodiment of the process for producing a smart information carrier, according to the present invention, the compositions of the lower melting point polymer in the sheet of two-polymer laminate on the same side of the natural fibre-containing or synthetic fibre-containing continuous support as the IC-module and the polymer foil with a melting point of up to 150° C. have the same composition.

In the lamination process the IC-module is encapsulated in the lower melting point polymer in a sheet of two-polymer laminate and the polymer of the polymer foil with a melting point of up to 150° C. Suitable polymers for this encapsulation process are PETG, PE, poly-1-butene, poly-1-pentene, poly-5-methyl-1-hexene, poly-1-octadecene, polyvinyl methyl ether, polyvinyl ethyl ether and other polymers with a melting point of up to 150° C.

The higher melting point polymer of the two-polymer laminate sheets provides the outermost layer protective layers of the smart information carrier and hence should be resistant to normal wear with polymers with a glass transition temperature of at least 60° C. being preferred and orientable polymers with a glass transition temperature of at least 60° C. being particularly preferred. Suitable polymers are axially stretched (oriented) polyesters e.g. PET and PEN, polycarbonate, amorphous polyesters and polyvinyl chloride and may be the same or different, with biaxially oriented PET being particularly preferred.

According to a third embodiment of the process for producing a smart information carrier, according to the present invention, the two polymer laminate is not a polyester laminate formed from different polyester materials.

Smart Information Carrier

According to a nineteenth embodiment of the smart information carrier, according to the present invention, the smart information carrier is an identification card selected from the group consisting of an identity card, a security card, a driver's licence card, a social security card, a membership card, a time registration card, a bank card, a pay card and a credit card.

According to a twentieth embodiment of the smart information carrier according to the present invention, the smart information carrier further comprises at least one additional security element or information carrier selected from the group consisting of holograms, and magnetic strips.

According to a twenty-first embodiment of the smart information carrier according to the present invention, the smart information carrier is a flexible sheet e.g. any page of a passport or a page of a passport with personalized data of the bearer.

According to a twenty-second embodiment of the smart information carrier according to the present invention, the information carrier is an admission document e.g. a visa, a ticket for an event and lottery tickets.

According to a twenty-third embodiment of the smart information carrier according to the present invention, the smart information carrier is an identification card selected from the group consisting of an identity card, a security card, a driver's licence card, a social security card, a membership card, a time registration card, a bank card, a pay card, a credit card and a passport page.

ISO 7810 specifies three formats for identity cards: ID-1 with the dimensions 85.60 mm×53.98 mm, a thickness of 0.76 mm is specified in ISO 7813, as used for bank cards, credit cards, driving licences and smart cards; ID-2 with the dimensions 105 mm×74 mm, as used in German identity cards, with typically a thickness of 0.76 mm; and ID-3 with the dimensions 125 mm×88 mm, as used for passports and visa's. A final thickness of 0.76 mm can be realized by lamination with the application of heat and pressure of one or more polymeric foils, e.g. PVC foils.

The finished ID card can serve as an identity card, a security card, a driver's licence card, a social security card, a bank card, a membership card, a time registration card, a pay card and a credit card, etc.

The present invention is illustrated hereinafter by way of COMPARATIVE EXAMPLES and INVENTION EXAMPLES without be limited thereto. The percentages and ratios given in these examples are by weight unless otherwise indicated.

COMPONENTS USED:

Natural fibre-containing continuous support: paper having a weight of 110 g/m$^2$ coated on both sides with 20 g/m$^2$ of polyethylene, the outmost sides of which are subbed with a gelatin layer.

Transparent PET/PE laminate consisting of a 100 μm thick PET foil and a 75 μm thick PE foil Transparent VISTAFIX PE foil: 125 μm thick IC-module from SPS consisting of a ca. 20 mm×12 mm antenna with rounded corners wire-bonded to an electronic chip the IC-module comprises an electronic chip and an antenna on separate KAPTON® supports laminated together in a module ca. 350 μm thick with the dimensions of the antenna.

Invention Example

A natural fibre-containing continuous support having dimensions slightly smaller than the envisaged dimensions of the final card was printed on both sides e.g. an image was produced by DTR-printing using the silver nuclei present in the gelatin subbing layer. One security-printed side of the natural fibre-containing continuous support was placed on the PE-side of a sheet of PE/PET-laminate and the IC-module (from SPS) with the antenna uppermost was placed on the other side of the natural fibre-containing continuous support. A second sheet of PET/PE laminate with the PE side in contact with the antenna was then paced on the side of the paper with the module with between 0 and 3 sheets of PE foil in between and the resulting sandwich laminated at 160° C. with an EXCELAM 655Q laminator (from GMP Co. Ltd, Korea) with an opening of 1 mm. The resulting laminate was punched out to produce a smart card with an edge of ca. 1 mm all round in which the interlaminating foils had laminated with each other beyond the edge of the natural fibre-containing continuous support.

From one side of the resulting smart card, the antenna was clearly visible through the laminated PE-foil and PET/PE laminate, but the antenna was not visible through the natural fibre-containing continuous support. Depending on how many sheets of PE-foil were used, the profile of the IC-module was more or less detectable from the paper side. With three sheets of PE foil the profile of the IC-module was barely detectable. This was quantified by four thickness measurements at the IC-module side of the card and four thickness measurements at the non-IC-module side of the card. Measurements are given below in Table 1 for two and three sheets of PE-foil.

TABLE 1

|   | 2 sheets of PE foil Thickness [μm] | 3 sheets of PE foil Thickness [μm] |
| --- | --- | --- |
| 1 (IC-module side) | 1107 | 865 |
| 2 (IC-module side) | 1117 | 875 |
| 3 (IC-module side) | 1098 | 878 |
| 4 (IC-module side) | 1086 | 888 |
| 5 (non-IC-module side) | 825 | 873 |
| 6 (non-IC-module side) | 797 | 877 |
| 7 (non-IC-module side) | 813 | 870 |
| 8 (non-IC-module side) | 806 | 870 |

Thus the molten PE had entirely encapsulated the IC-module and the encapsulating PE was integrally connected to the PE which was attached to the image on the IC-module side of the natural fibre-containing continuous support. Therefore delamination of the resulting smart card to extract the IC-module would result in severe degradation of the security printing on the same side of the natural fibre-containing continuous support as the IC-module.

The present invention may include any feature or combination of features disclosed herein either implicitly or explicitly or any generalisation thereof irrespective of whether it relates to the presently claimed invention. In view of the foregoing description it will be evident to a person skilled in the art that various modifications may be made within the scope of the invention.

Having described in detail preferred embodiments of the current invention, it will now be apparent to those skilled in the art that numerous modifications can be made therein without departing from the scope of the invention as defined in the following claims.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Of course, variations of those preferred embodiments will become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A smart information carrier comprising a security element having two sides each side being laminated with at least one transparent polymer foil having a melting point higher than 150° C. so that said security element is surrounded by an edge at least 1 mm wide in which said at least one transparent polymer foil on each side of the security element are laminated to one another, said security element comprising an IC-module and a natural fibre-containing or synthetic fibre-containing continuous support exclusive of an antenna, said IC-module comprising an electronic chip and an antenna integrated therein, wherein said support is security printed on at least the side of said support nearer to said IC-module and said IC-module is at least substantially encapsulated with a transparent polymer or polymer mixture with a melting point up to 150° C. wherein the transparent polymer or polymer mixture also coats at least the part of the side of said support nearer to said IC-module non-adjacent to said IC-module.

2. Smart information carrier according to claim 1, wherein the radio frequency-readability of said IC-module at a frequency of 13.56 MHz is limited to less than 5 cm.

3. Smart information carrier according to claim 1, wherein the security printing has been carried out by a printing technique selected from the group consisting of non-impact and impact printing techniques.

4. Smart information carrier according to claim 1, wherein the smart information carrier is an identification card selected from the group consisting of an identity card, a security card, a driver's license card, a social security card, a membership card, a time registration card, a bank card, a pay card, a credit card and a passport page.

5. A method for producing a smart information carrier comprising the steps of:
   (a) security printing at least one side of a natural fibre-containing or synthetic fibre-containing continuous support;
   (b) placing an IC-module comprising an electronic chip and an antenna integrated therein on a security printed side of the natural fibre-containing or synthetic fibre-containing continuous support;
   (c) placing a first sheet of a transparent two-polymer laminate with a high melting point side having a melting point higher than 150° C. and a lower melting point side on said IC-module with the lower melting point side nearer the IC-module;

(d) placing a second sheet of a transparent two-polymer laminate with a high melting point side having a melting point higher than 150° C. and a low melting point side with the lower melting point side near the side of the support that is distant from the IC-module;

(e) placing at least one sheet of a transparent polymer foil with a melting point of up to 150° C. between said IC-module and the lower melting point side of said first sheet of a transparent two-polymer laminate; and (f) laminating the resulting sandwich in a laminator; and (g) punching out a smart information carrier from the sandwich so that said support is surrounded by an edge at least 1 mm wide in which the transparent two-polymer laminates are directly laminated to one another, wherein said natural fibre-containing or synthetic fibre-containing continuous support is exclusive of an antenna; and wherein steps (d) and (e) are carried out in any order.

6. The method for producing a smart information carrier according to claim 5, wherein the continuous support is a natural fibre-containing continuous support and the lower melting point polymer in the sheet of the two-polymer laminate on the same side of the continuous support as the IC-module and the polymer foil with a melting point of up to 150° C. have the same composition.

7. The method for producing a smart information carrier according to claim 5, wherein the continuous support is a synthetic fibre-containing continuous support and the lower melting point polymer in the sheet of the two-polymer laminate on the same side of the continuous support as the IC-module and the polymer foil with a melting point of up to 150° C. have the same composition.

* * * * *